(12) United States Patent
Rodriguez et al.

(10) Patent No.: US 9,946,278 B2
(45) Date of Patent: Apr. 17, 2018

(54) DROOP DETECTION FOR LOW-DROPOUT REGULATOR

(71) Applicant: Advanced Micro Devices, Inc., Sunnyvale, CA (US)

(72) Inventors: Miguel Rodriguez, Fort Collins, CO (US); Stephen Victor Kosonocky, Fort Collins, CO (US); Ravinder Reddy Rachala, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 176 days.

(21) Appl. No.: 14/720,385

(22) Filed: May 22, 2015

(65) Prior Publication Data

US 2016/0342166 A1 Nov. 24, 2016

(51) Int. Cl.

| G05F 1/56 | (2006.01) |
|---|---|
| H02M 7/06 | (2006.01) |
| G05F 1/62 | (2006.01) |
| H02M 7/12 | (2006.01) |
| G05F 1/563 | (2006.01) |

(52) U.S. Cl.
CPC ............. *G05F 1/56* (2013.01); *G05F 1/562* (2013.01); *G05F 1/563* (2013.01); *G05F 1/62* (2013.01); *H02M 7/062* (2013.01); *H02M 7/125* (2013.01)

(58) Field of Classification Search
CPC ..... G05F 1/56; G05F 1/62; G05F 1/59; G05F 1/575; G05F 1/562; G05F 1/563; H02M 7/062; H02M 7/125; H02M 2001/008; G06F 1/26; G06F 1/32; G06F 1/3243; G06F 1/3296; G06F 1/305; G06F 1/3287; H03F 1/0233; H03F 1/025; H03F 2200/102; H03F 3/21; Y02B 60/1239; Y02B 60/1285

USPC .............. 323/280; 700/292, 293, 294
See application file for complete search history.

(56) References Cited

U.S. PATENT DOCUMENTS

| 2004/0251883 A1 | 12/2004 | Brosh et al. |
| 2009/0138737 A1 | 5/2009 | Kim et al. |
| 2009/0153109 A1 | 6/2009 | Koertzen et al. |
| 2010/0085108 A1 | 4/2010 | Lundberg |

(Continued)

OTHER PUBLICATIONS

R. Jotwani et al., "An x86-64 Core in 32 nm SOI CMOS," IEEE Journal of Solid-State Circuits, vol. 46, No. 1, Jan. 2011, pp. 162-172.

(Continued)

*Primary Examiner* — Fred E Finch, III
*Assistant Examiner* — Demetries A Gibson
(74) *Attorney, Agent, or Firm* — Polansky & Associates, P.L.L.C.; Paul J. Polansky

(57) ABSTRACT

A processor system includes first and second regulators for regulating an adjusted supply voltage. In one embodiment, the regulator system comprises a digital low-dropout (DLDO) control system comprising first and second regulators that generate a plurality of control signals to regulate an adjusted power supply voltage and that generate a charge when a droop level falls below a droop threshold value. The first regulator implements a first control loop and the second regulator implements a second and much faster acting control loop. A supply adjustment block with the two regulators and control loops are provided for each processor core allowing different cores to have different regulated supply levels all based on one common supply.

12 Claims, 8 Drawing Sheets

(56) References Cited

U.S. PATENT DOCUMENTS

| | | | |
|---|---|---|---|
| 2011/0142263 A1* | 6/2011 | Sun | G05F 1/46 |
| | | | 381/122 |
| 2014/0152339 A1 | 6/2014 | Mora Sanchez | |
| 2014/0277812 A1* | 9/2014 | Shih | G05F 1/563 |
| | | | 700/298 |
| 2016/0179163 A1* | 6/2016 | Haider | G06F 1/3243 |
| | | | 713/320 |
| 2016/0246342 A1* | 8/2016 | Muthukaruppan | G05F 1/59 |
| 2016/0266175 A1* | 9/2016 | Nizza | G01R 19/0092 |
| 2016/0282889 A1* | 9/2016 | Mahajan | G05F 1/575 |

OTHER PUBLICATIONS

Zeynep Toprak-Deniz et al., "Dual-Loop System of Distributed Microregulators with High DC Accuracy, Load Response Time Below 500ps, and 85mV Dropout Voltage," 2011 Symposium on VLSI Circuits Digest of Technical Papers, 978-4-86348-165-7, pp. 274-275.

International Search Report and Written Opinion for International Application No. PCT/US2016/052846, dated Dec. 21, 2016, 14 pages.

\* cited by examiner

DROOP DETECTION FOR LOW-DROPOUT REGULATOR

FIELD OF THE DISCLOSURE

The present disclosure relates generally to power control and, more particularly, to low-dropout regulators for large digital logic circuits such as microprocessors.

BACKGROUND

Integrated circuits and other discrete circuits often include a power supply often labeled VDD that provides a source voltage for the associated circuitry. A circuit, for example an inverter, is often connected between the supply and circuit common or ground. In the case of MOSFET transistors, a specified voltage at a gate terminal activates the transistor to create a circuit path to drive circuit elements connected between an output terminal and the supply or ground and to drive the operation of subsequent circuits connected to the output terminal. Typically, the amount of current and circuit loading is related to both the operation speed and power supply voltage. Because of the active nature of many circuits, the loading will sometimes vary and, at times, may cause a supply voltage level to drop or be lowered from the desired level.

Voltage droop is a term used to refer to the drop in voltage from the desired voltage level as the supply drives a load. In a regulated system, the output voltage can sag when a load is suddenly increased very rapidly. For example, a transient loading condition may occur causing a voltage droop. If the droop is too large, then circuit failure results.

In prior art systems, supply adjustment circuits, or "header" circuits, are operably disposed between a supply and a circuit and are regulated to adjust or compensate for such variations in the supply. For example, some solutions include header circuits that constantly switch at a relatively high frequency above 1 GHz to minimize the loading from the transient response and to regulate the supply voltage. These header circuits are often optimized to respond very quickly to voltage droops due to transient loading conditions and other loading conditions.

These prior art systems typically have substantial customized analog design blocks and add significant overhead as they switch in and out of connecting relatively large field effect transistors in order to respond to transient loading conditions. This even occurs when operating in a steady-state mode. Thus, such systems not only consume precious integrated circuit real estate, but also are inefficient from a power perspective.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
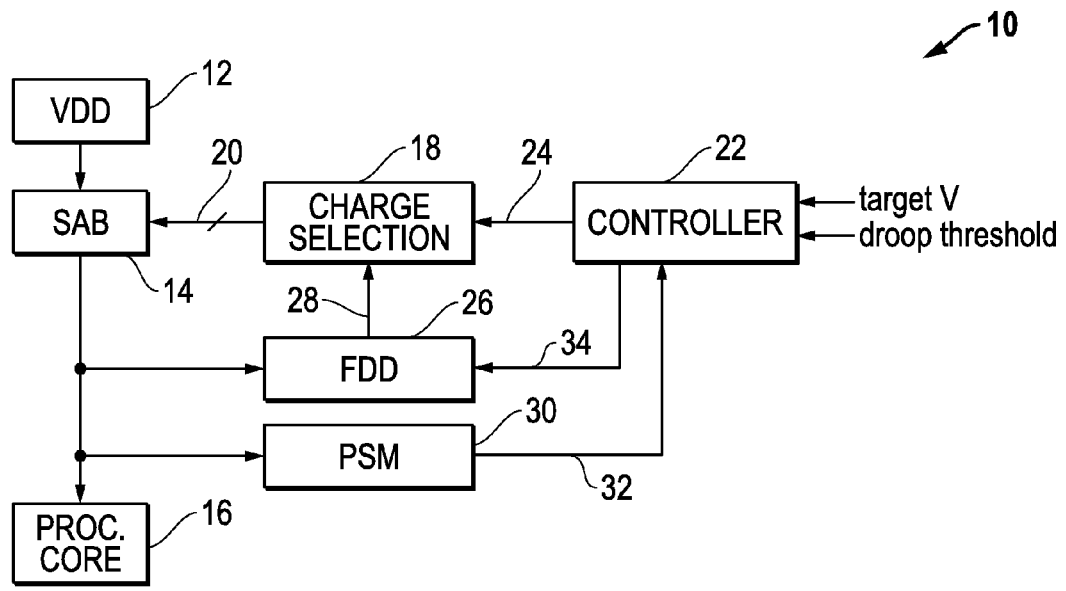
FIG. 1 illustrates, in block diagram form, a processor system connected to deliver power to a processor core according to an embodiment.

FIG. 1 illustrates, in block diagram form, a processor system connected to deliver an adjusted supply voltage to a processor core according to an embodiment. Referring to FIG. 1, a processor system 10 includes an input port shown as VDD 12 connected to receive a supply voltage from an external voltage source. The input port conducts the received supply voltage to a supply adjustment block 14. Supply adjustment block 14 is connected to produce an adjusted supply voltage to a processor core 16. A charge selection block 18 generates control signals 20 that are produced to supply adjustment block 14. A first regulator shown as controller 22 and comprises a low-drop out controller that generates control signals 24 to charge selection block 18. A second regulator, which comprises a fast droop detector (FDD) labeled as FDD 26, also generates control signals 28 to charge selection block 18.

FDD 26 is connected to receive the adjusted supply voltage produced by supply adjustment block 14 as well as a droop threshold level 34 from controller 22. A power supply monitor (PSM) 30 is also connected to receive the adjusted supply voltage produced by supply adjustment block 14. Among other communications and signals, PSM 30 produces a digital representation 32 of the adjusted supply voltage to controller 22.

Controller 22 not only receives the digital representation 32 of the adjusted supply voltage from PSM 30, but also receives a target voltage and a droop threshold level from an external source. For example, the external source may comprise a power control block or module for the integrated circuit or a register whose value is set by an operating system. Both the target voltage and the droop threshold voltage are received as digital values. Controller 22, therefore, regulates the adjusted supply voltage produced by supply adjustment block 14 based on a comparison of the adjusted supply voltage to the target voltage via control signals 24. Controller 22 can be, for example, a proportional-integral-derivative (PID) controller.

Additionally, as described before, controller 22 produces the droop threshold level 34 to FDD 26. When the adjusted supply voltage reaches or falls below the droop threshold level, FDD 26 generates a charge injection signal 28 as a control signal to charge selection block 18. Charge selection block 18, in turn, generates control signals 20 to supply adjustment block 14 to inject a charge, or more specifically, to increase the adjusted supply voltage magnitude produced to processor core 16 as a part of regulating the adjusted supply voltage by changing the conductivity of the transistors within the header circuitry by switching individual transistors in or out to regulate the voltage. The embodiments that show this level of detail are described in relation to the figures that follow.

Generally, the above described system comprises, in one embodiment, a digital low-dropout (DLDO) control system comprising first and second regulators that generate a plurality of control signals to regulate an adjusted power supply voltage and to generate a charge when a droop level falls below a threshold value. A processor core, such as processor core 16, includes a supply port for receiving the adjusted power supply voltage and a charge in response to a detected droop condition. The DLDO control system is connected to monitor the adjusted power supply voltage received at the supply port to evaluate the droop level.

In operation, the first regulator, i.e., controller 22, regulates the supply voltage to equal a target power supply voltage using a first regulation loop having a first bandwidth. The first regulator not only receives a target adjusted supply voltage from an external source but also receives a droop level threshold. The first regulator also receives from PSM 30 a digital representation 32 of the adjusted supply voltage. The first regulator therefore generates control signals 24 to adjust the settings of the supply adjustment block 14 in response to differences between the target voltage and the actual adjusted supply voltage to regulate the voltage produced by the supply adjustment block 14.

The second regulator, namely FDD 26 in the described embodiment, regulates the adjusted supply voltage using a second regulation loop having a second bandwidth that is different from the first bandwidth. More specifically, the second regulator compares the adjusted supply voltage to the received droop threshold 34 and generates a charge injection signal 28 to quickly adjust the adjusted supply voltage to raise the adjusted supply voltage above the droop threshold level.

The second regulation loop is a fast acting loop in relation to the first regulation loop. While the first loop is a digital control loop (utilizing clock based digital logic) and therefore operates based on clock cycles, the second regulation loop is configured to detect a droop that reaches the droop threshold as it happens. In one embodiment, the second regulator implements analog circuitry to perform the droop detection and voltage regulation. Accordingly, by implementing a system with this second regulation loop, the logic for the supply adjustment block 14 need not be as complicated or operate at high frequencies as described in relation to prior art systems thereby reducing power consumption and IC real estate. Moreover, because the processing that occurs for the first regulation loop is in the digital domain, power consumption and silicon footprint size is reduced further while adding flexibility to the design and operation.

Figure 2:
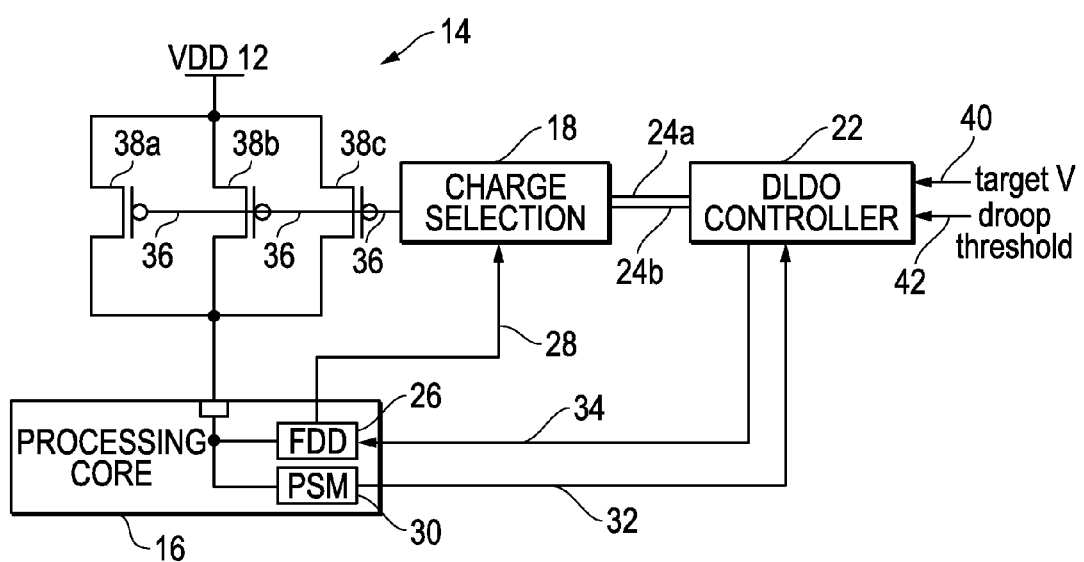
FIG. 2 illustrates, partially in block diagram form and partially in schematic form, further details of a processor system and a supply adjustment block according to an embodiment.

FIG. 2 illustrates, partially in block diagram form and partially in schematic form, further details of a processor system and a supply adjustment block according to an embodiment. Supply VDD 12 conducts the supply voltage to supply adjustment block 14 as described before in relation to FIG. 1. Supply adjustment block 14 includes a plurality of selectable resistive elements that are connected in parallel. Stated differently, an input node of each resistive element is connected to VDD 12 while an output node of each resistive element is commonly connected to an input port of processing core 16. Processing core 16 includes an output port for transmitting a signal 32 to controller 22 and an input port for receiving a signal 34 from controller 22. In the described embodiment, processing core 16 transmits a digital representation of the adjusted supply voltage magnitude 32 and receives a droop threshold level 34.

Processor core 16 further includes an output port for transmitting the charge inject signal 28 to charge selection block 18. Controller 22 further is connected to receive, from an external source, the target voltage signal and the droop threshold signal. Controller 22, in the described example, includes output buses 24a and 24b that are connected to charge selection block 18. Buses 24 *a-b* carry control words for selecting the selectable resistive elements (here, MOSFETs) to regulate the adjusted supply voltage. Charge selection block 18 is connected to receive the charge injection signal 28 from FDD 26 of processing core 16 and to produce selection signals to select one or more of the resistive elements 38 *a-c* of supply adjustment block 14.

As may be seen, the power supply voltage is received by supply adjustment block 14 from VDD 12. Supply adjustment block 14 comprises a plurality of resistive elements that are selectable and are configured to vary a voltage drop across the supply adjustment block 14 by varying the total resistance thereby adjusting the available voltage that is produced to the processing core 16. Specifically, in the described embodiment, a plurality of parallel-connected scaled resistive elements is shown wherein each of the resistive elements comprises a P-channel MOSFET. It should be understood that the resistive elements may be configured in series or, alternatively, in a combination of series and parallel connections. Moreover, the resistive elements are scaled to achieve the desired resistive range. Further, the type of elements (e.g., P-channel or N-channel MOSFETs) used impacts the associated control logic of, for example, charge selection block 18.

In the described embodiment, the adjusted supply produced by supply adjustment block 14 is produced to processor core 16. FDD 26 and PSM 30 are configured and formed within processing core 16. Accordingly, the adjusted supply is produced directly to both FDD 26 and PSM 30. PSM 30 is operable to generate a digital value that represents the adjusted supply voltage level and to transmit the digital value 32 to the first regulator 22. In the example of FIG. 2, the first regulator (controller 22) is a digital low dropout (DLDO) controller.

Controller 22 is shown to be disposed outside of the processing core 16. As such, controller 22 may operate to control and regulate the adjusted supply voltage even if processor core 16 is powered off. In an alternative embodiment, controller 22 may be disposed and configured within processing core 16. In both embodiments, controller 22 comprises digital processing circuitry.

One aspect of the embodiment illustrated in FIG. 2 is that controller 22 is configured to generate at least one control word on at least one control bus to specify which of the resistive elements are turned on to adjust the supply voltage produced by supply adjustment block 14. In the described embodiment, controller 22 generates first and second control words on first and second control buses 24a and 24b, respectively, to select which resistive elements are to be turned on or off to adjust the supply voltage based on a difference between the supply voltage and a target voltage and when the second regulator, namely FDD 26, generates the charge injection signal 28 because the adjusted supply voltage has dropped to or below the droop threshold level, respectively. Charge selection logic 18 then selects and biases resistive elements according to the settings on the first and second logic buses and the state of the charge injection signal.

Figure 3:
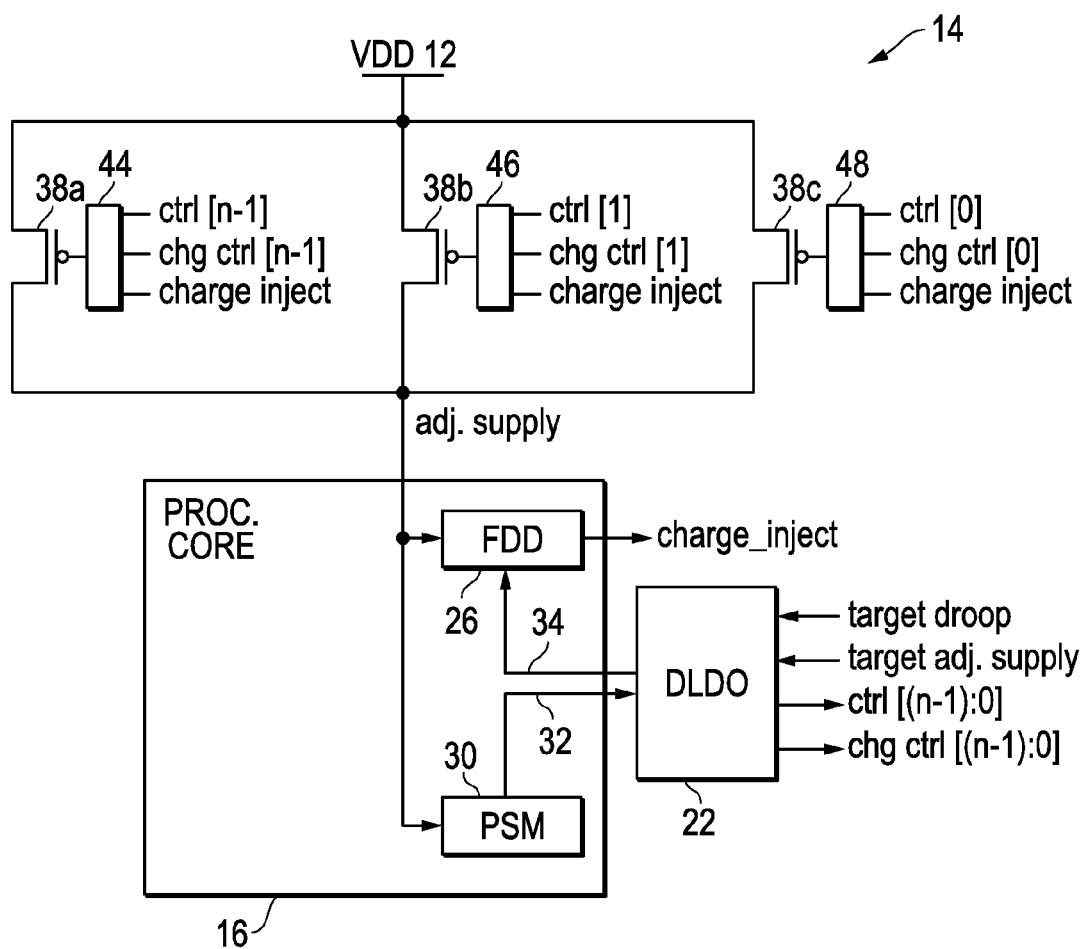
FIG. 3 illustrates, partially in block diagram form and partially in schematic form, further details of a processor system and a supply adjustment block according to an embodiment.

FIG. 3 illustrates, partially in block diagram form and partially in schematic form, further details of a processor system and a supply adjustment block according to an embodiment. Supply VDD 12 is connected to produce a power supply voltage to supply adjustment block 14. Supply adjustment block 14 includes a plurality of selectable resistive elements that are connected in parallel. In the described embodiment, each of the resistive elements comprises P-channel MOSFET 38*a-c*. It should be understood that more than three resistive elements may be included and that only three are shown here for simplicity. The input nodes, comprising source terminals, of MOSFETs 38 *a-c* are connected to receive the power supply voltage from the VDD 12. The drain terminals of MOSFETs 38 *a-c* are commonly connected to an output node of supply adjustment block 14 to produce the adjusted supply to an input port of processor core 16.

A gate terminal of MOSFET 38*a* is connected to receive a bias signal from charge selection logic 44. Similarly, a gate terminal of MOSFET 38*b* is connected to receive a bias signal from charge selection logic 46 and a gate terminal of MOSFET 38*b* is connected to receive a bias signal from charge selection logic 48. Charge selection logic 44-48 each receive at least one bit from a control word and a charge control word, namely "ctrl [(n−1):0]" and "chg_ctrl [(n−1):0]", respectively, and a charge injection signal "charge inject". The first regulator generates the control word and the charge control word and the second regulator charge generates the charge inject signal.

In the embodiment of FIG. 3, FDD 26 (the second regulator) and PSM 30 are formed within processor core 16 while DLDO 22 (the first regulator) is formed external to processor core 16 but comprises digital processing circuitry. Alternatively, DLDO 22 may be formed/configured within processor core 16.

In operation, DLDO controller 22 is connected to receive the digital representation 32 of the adjusted supply voltage from PSM 30 and the target droop threshold and the target adjusted supply voltage level from an external source such as a power supply controller. Based upon a difference between the adjusted supply voltage value received from PSM 30 and the target adjusted supply voltage level, controller 22 generates control signal "ctrl [(n−1):0]" to activate selected resistive elements which, in the described embodiment, comprise the MOSFETs of the supply adjustment block 14. Controller 22 also generates the charge control signal "chg_ctrl [(n−1):0]" to activate selected resistor configured MOSFETs of the supply adjustment block 14 whenever the second controller, namely FDD 26, generates the charge injection signal labeled "charge inject" as shown here in FIG. 3. As a part of this operation, controller 22 produces the target droop threshold to second controller FDD 26 to enable FDD 26 to determine when the adjusted supply voltage has reached the target droop threshold. One of average skill in the art may readily modify internal logic of each of the charge selection blocks 44-48 according to design requirements and the type of devices used (e.g., P-channel or N-channel MOSFETs) from the logic shown below in relation to FIG. 4.

Figure 4:
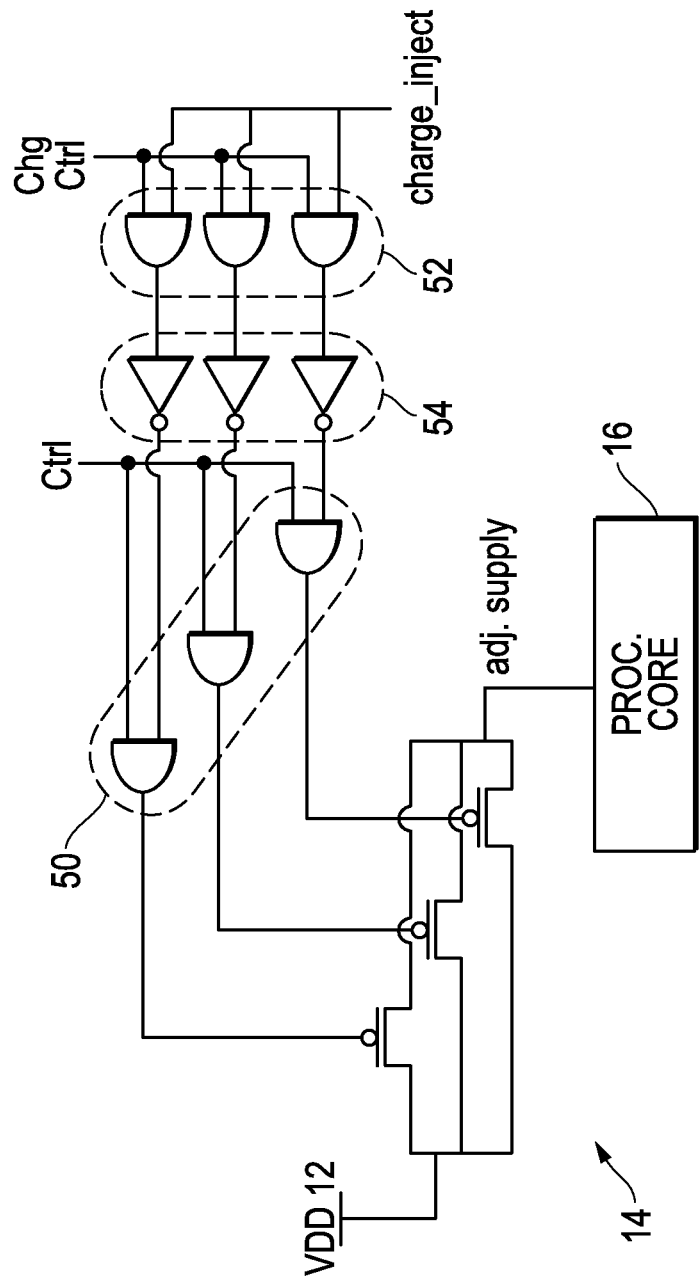
FIG. 4 illustrates, partially in block diagram form and partially in schematic form, further details of a supply adjustment block and associated charge control logic according to an embodiment.

FIG. 4 illustrates, partially in block diagram form and partially in schematic form, further details of a supply adjustment block and associated charge control logic according to an embodiment. Supply voltage VDD 12 is conducted to supply adjustment block 14. Supply adjustment block 14, as described before, includes a plurality of selectable resistive elements. In the specific embodiment shown of FIG. 4, three parallel-connected P-channel MOSFETs are shown though a different number and configuration of resistive elements may be utilized. The supply is conducted to the source terminals of the P-channel MOSFETs and the resulting adjusted supply voltage is produced from the drain terminals of the MOSFETs. An output node of the supply adjustment block 14 is connected to deliver the adjusted supply voltage to processor core 16.

FIG. 4 illustrates one example of the charge selection logic that selectively biases the P-channel MOSFETs of the supply adjustment block 14 to connect or remove the selected MOSFETs from circuit operation thereby changing the voltage drop across the supply adjustment block 14. As may be seen, supply adjustment block 14 includes a plurality of P-channel MOSFETs that are connected in parallel. As before, it should be understood that only three MOSFETs are shown for simplicity. The charge selection logic includes a first plurality of AND gates 50, a second plurality of AND gates 52, and a plurality of inverters 54 connected between the first and second pluralities of AND gates 50 and 52, respectively.

Each gate terminal of the P-channel MOSFETs is connected to receive an output of an AND gate of the first plurality of AND gates 50. Each AND gate of the first plurality of AND gates 50 includes one commonly connected input that is connected to receive the control word ("ctrl [(n−1):0]") generated by the first regulator (not shown here in FIG. 4) that specifies which selectable MOSFETs are to be turned on to regulate the adjusted supply voltage to drive the adjusted supply voltage to the target adjusted supply voltage. A second input of each of the AND gates of the first plurality of AND gates 50 is connected to receive the output of an inverter of the plurality of inverters 54. Each input of the inverters of the plurality of inverters 54 is connected to receive the output of the AND gates of the second plurality of AND gates 52.

Each AND gate of the second plurality of AND gates 52 has a commonly connected input connected to receive the charge control word ("chg_ctrl [(n−1):0]") generated by the first regulator that specifies which AND gates are to be turned on (and therefore which selectable resistive element) when the "chg_inject" signal is asserted by the second regulator, namely, FDD 22. A second input of each of the AND gates of the second plurality of AND gates 52 is commonly connected to receive the charge inject signal ("chg_inject") that is asserted by the second regulator FDD 22. As many also be seen from examining FIG. 4, there is one AND gate of the first plurality of AND gates, one inverter and one AND gate of the second plurality of AND gates for each MOSFET of the supply adjustment block.

In operation, the combination of the AND gates and the inverters operate as a NAND gate because of the inversion of its output. Alternatively, NAND gates may be used in place of the combination of inverters and AND gates. More specifically, the P-channel transistors become active on an application of a low voltage on their gates, resulting in a negative gate to source voltage above the threshold voltage while the outputs of each of the AND gates 52 are inverted by the corresponding inverters of the plurality of inverters 54. Accordingly, for any given P-channel MOSFET of the supply adjustment block 14, the MOSFET operates as a resistive element either when the control word selects the MOSFET or when the charge control word selects the MOSFET and the charge injection signal is asserted.

Figure 5:
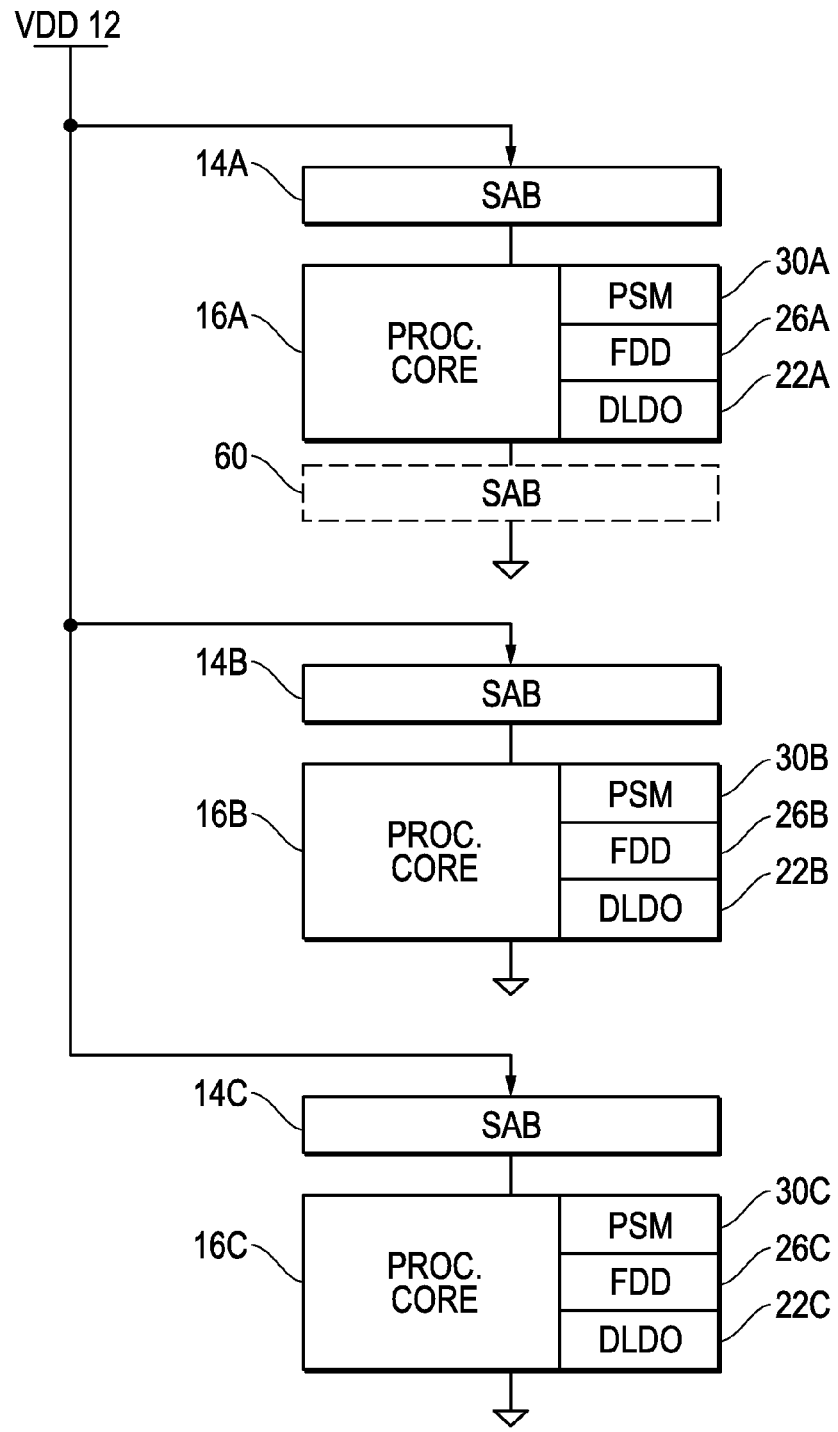
FIG. 5 illustrates, in block diagram form, a system for regulating supply voltages to a plurality of processor cores according to an embodiment.

FIG. 5 illustrates, in block diagram form, a system for regulating supply voltages to a plurality of processor cores according to an embodiment. A supply VDD 12 is connected to a plurality of supply adjustment blocks 14A-C. Each of the supply adjustment blocks 14A-C is connected to produce an adjusted supply voltage to a processor core 16 A-C. Each of the processor cores 16 A-C includes a PSM 30 A-C, an FDD 26 A-C, and a DLDO 22 A-C. Each of the blocks shown within the processor cores is configured and operates as described previously. One exception, however, is that in this embodiment, each DLDO 22 A-C is formed within the processor core 16 A-C, respectively.

In an alternative embodiment of the invention, a supply adjustment block 60 may be used either in addition to or in place of a supply adjustment block 14. As may be seen, supply adjustment block 60 is a footer circuit rather than a header circuit meaning that the supply adjustment block is connected between the processor core and ground instead of being connected between the processor core and the supply. In an embodiment where a supply of adjustment block 60 is included, the specific discrete logic would be modified to support the desired operations and one of average skill in the art may readily make such transformations in design. The aspects described before relating to the first and second regulators would remain the same. Thus, for example, a charge inject signal generated by FDD 26 A-C would serve to activate or select resistive elements within supply adjustment block 60. While only one supply adjustment block 60 is shown in dashed lines, it should be understood that a plurality of supply adjustment blocks 60 could be included in the embodiment of FIG. 5.

One of average skill in the art may readily appreciate that the logic for a supply adjustment block 60 may differ than the logic for a supply adjustment block 14 as described here in this specification. As with a supply adjustment block 14 comprising a header circuit, a second regulator, namely FDD 26 A-C, generates a charge inject signal that causes selected resistive elements to be activated to adjust the voltage drop across the supply adjustment block 14 A-C and therefore to adjust voltage produced to the processor core 16 A-C.

Figure 6:
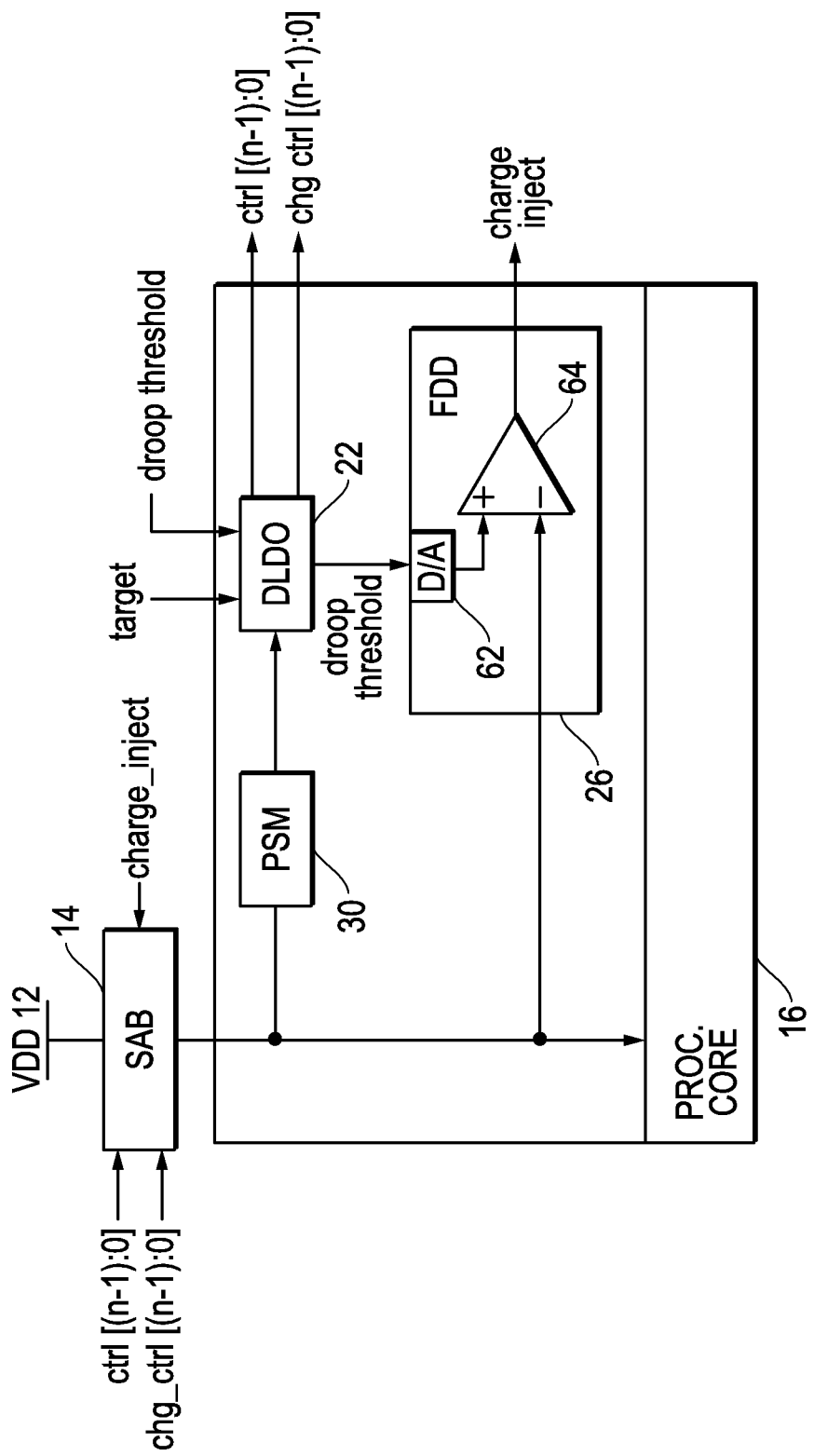
FIG. 6 illustrates, partially in block diagram form and partially in schematic form, further details of a regulator system that compensates for droop according to one embodiment.

FIG. 6 illustrates, partially in block diagram form and partially in schematic form, further details of a regulator system that compensates for droop according to one embodiment of the invention. A supply voltage VDD 12 is connected to sample adjustment block 14 that in turn produces the adjusted supply voltage to processor core 16. The magnitude of the adjusted supply voltage is based upon the values of a control word, a charge control word and the charge inject signal generated by FDD 26. All of this is as described previously in relation to other figures. As may also be seen in the described embodiment, PSM 30, DLDO 22 (the first regulator), and FDD 26 (the second regulator) are all formed within processor core block 16 in the embodiment of FIG. 6.

As described in relation to other figures, the adjusted supply voltage is produced to PSM 30 that in turn produces the digital representation of the adjusted supply voltage magnitude to DLDO 22. The adjusted supply voltage is also produced to FDD 26. DLDO 22 is further connected to receive the target adjusted supply voltage, shown as target ADJ VDD, and the droop threshold level from an external source. The external source may be a power management block in one embodiment. DLDO 22 produces the droop threshold level to FDD 22. DLDO 22 also produces the control word "ctrl [(n−1):0]" and the charge control word "chg_ctrl [(n−1):0]" to supply adjustment block 14.

FDD 22 includes a digital-to-analog converter (DAC) 62 that is connected to receive the droop threshold level from DLDO 22 and is configured to produce an analog signal whose magnitude corresponds to the received droop threshold level to a plus (+) input input of a comparator 64. In the described embodiment, DAC 62 is a sigma-delta converter. A minus (−) of comparator 64 is connected to receive the adjusted supply voltage produced by supply adjustment block 14. Comparator 64 generates the charge inject signal that activates the supply adjustment block whenever the adjusted supply voltage falls below the analog droop threshold level or voltage. It should be noted, the charge selection block utilizes NAND logic as described before in relation to other figures, a logic one for the charge injection signal triggers the charge injection or, more specifically, supply voltage adjustment for a selected MOSFET. A logic zero is only generated when the droop threshold is lower than the adjusted supply voltage. It should also be noted that that the described embodiment of FIG. 6 includes a first regulator (DLDO 22) formed within processor core block 16. In an alternative embodiment, the first regulator, namely DLDO 22, may be formed outside of processor core 16.

One aspect to note regarding the embodiment illustrated in FIG. 6, is that FDD 22 performs its processing very quickly by performing an analog comparison of the adjusted supply voltage and the droop threshold. Accordingly, the charge injection signal may be generated nearly instantly and may be generated much more quickly than processor-based digital logic that requires a number of clock cycles to obtain all necessary data and to process the data. As such, the second control loop that includes FDD 22 is a fast acting control loop to immediately correct or regulate the adjusted supply voltage whenever the adjusted supply voltage falls below the droop threshold level. The first regulation loop, in contrast, that includes the first regulator (DLDO 22), is a slower acting loop that compares the adjusted supply voltage to a target adjusted supply voltage value. By utilizing a fast acting second control loop with FDD 22, a simpler and slower first regulation loop may be utilized to reduce IC real estate and associated power consumption. Moreover, because the decision-making in the second control loop is made in analog (real time), the first control loop may be clocked at a lower rate thereby saving power.

Figure 7:
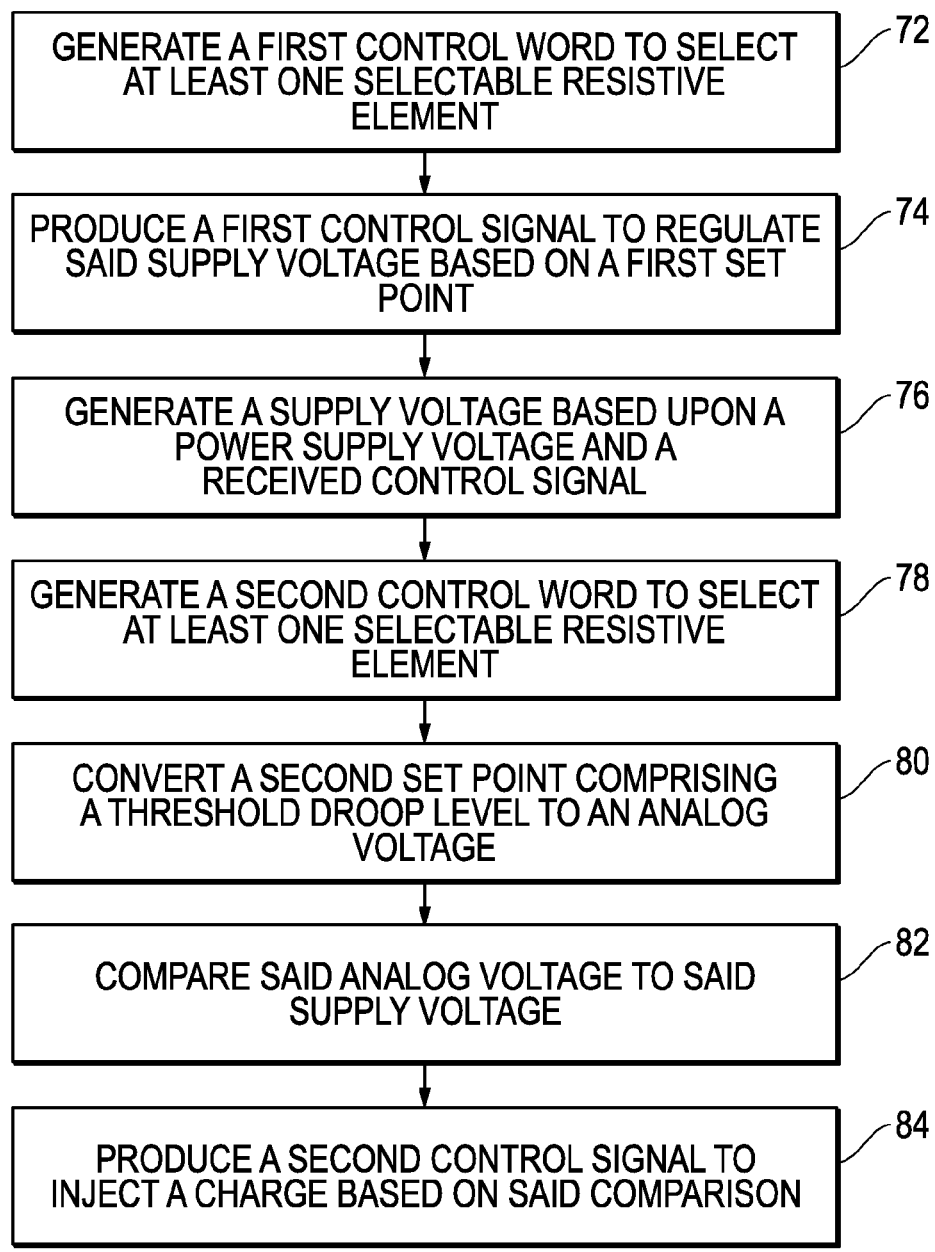
FIGS. 7, 8 and 9 are flowcharts that illustrate methods according to various embodiments.
Figure 8:
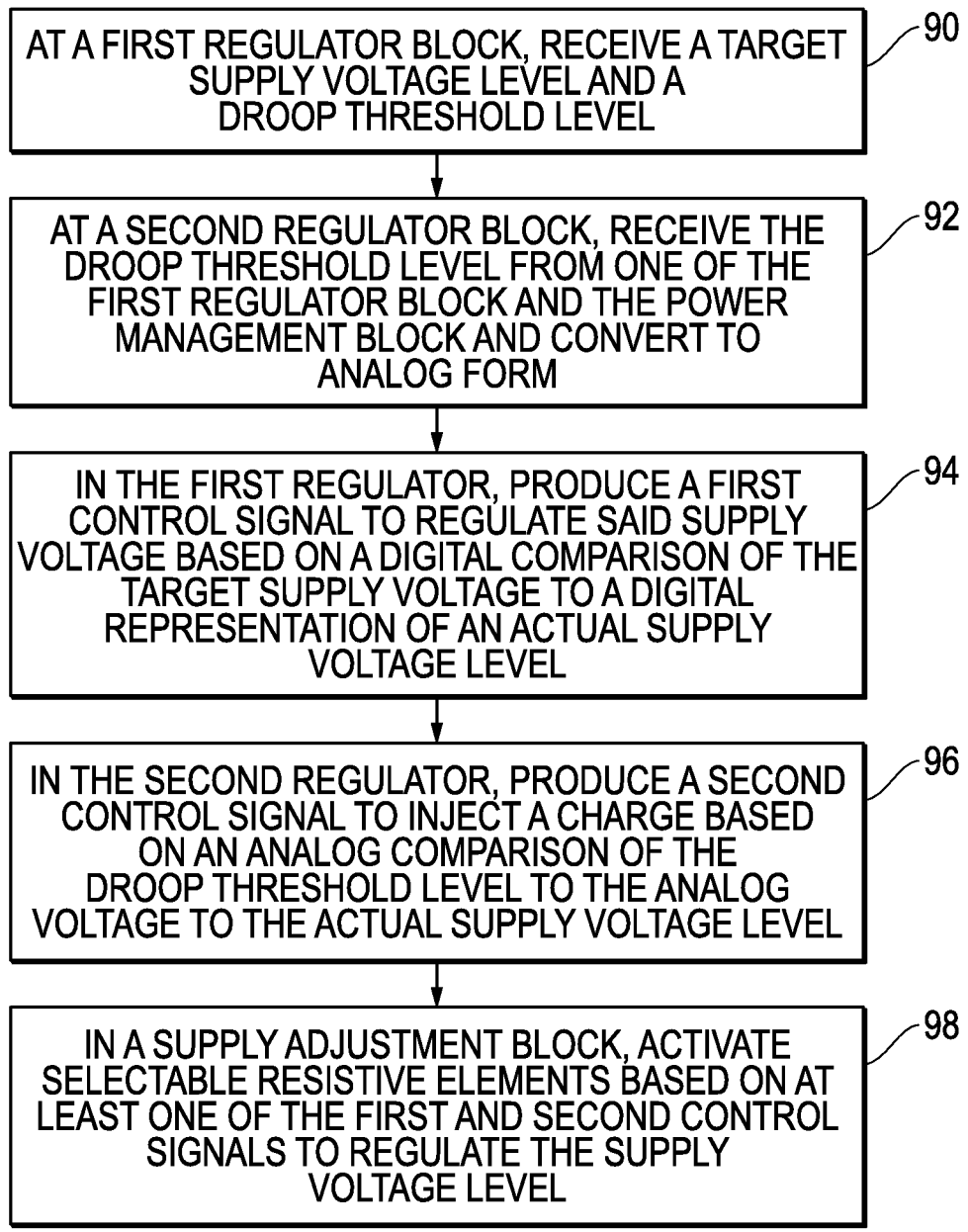
Figure 9:
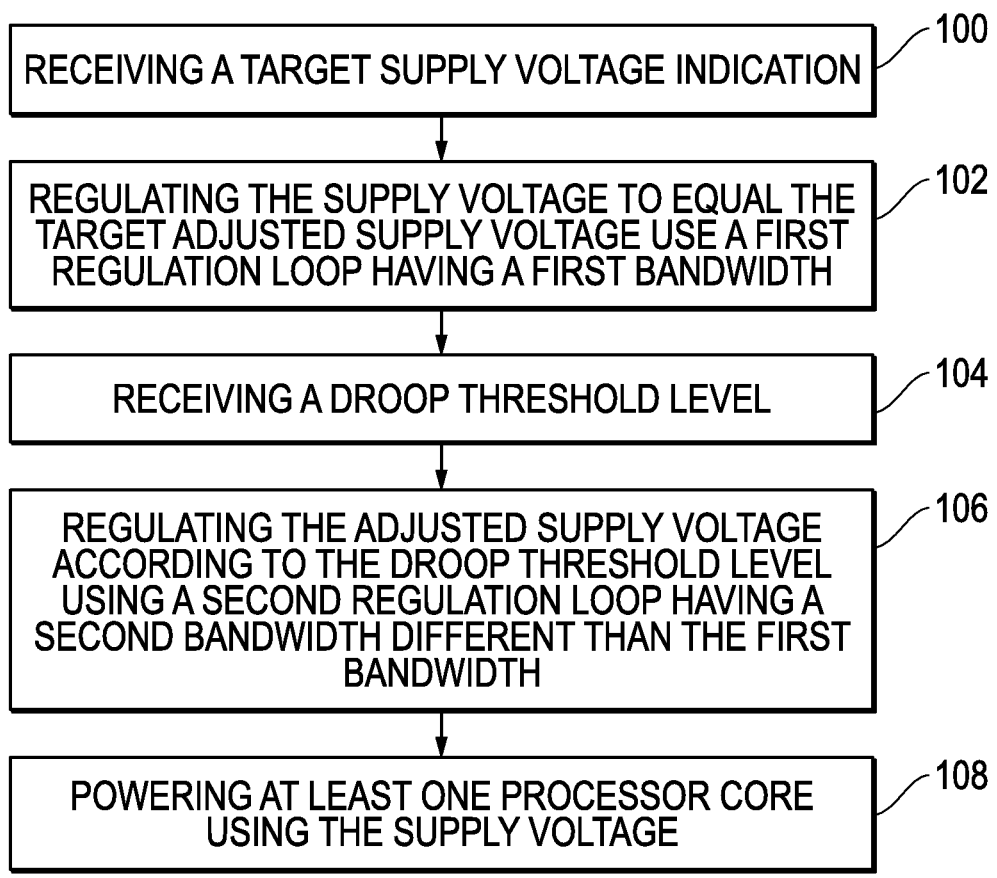

FIGS. 7, 8 and 9 are flowcharts that illustrate methods according to various embodiments of the invention. Referring to FIG. 7, the method includes generating a first control word to select at least one selectable resistive element within a supply adjustment block (72). This control word has been referenced previously as "ctrl [(n−1):0]" and was shown as being generated by the first regulator or DLDO 22. Thereafter, the method includes producing a first control signal to regulate the adjusted supply voltage based on a first set point (74). In one embodiment of the invention, the first set point comprises a target supply voltage level.

The method also includes generating an adjusted supply voltage based upon a received power supply voltage and a received control signal (76). This step is performed by the supply adjustment block in any of the configuration shown in the previous figures including those configurations where the supply adjustment block comprised a header or a footer circuit. The method also includes the first regulator, in the described embodiment, generating a second control word to select at least one selectable resistive element for charge injection (78). This second control word has been referenced previously as "chg_ctrl [(n−1):0]".

The method includes a second regulator, for example, FDD 22, converting a second set point comprising a droop threshold level to an analog voltage (80) and comparing the analog voltage to the adjusted supply voltage (82). Finally, the method includes producing a second control signal to inject charge (regulate the voltage to increase the adjusted supply voltage above the droop threshold level) based on the comparison of the analog voltage to the adjusted supply voltage (84). In the described embodiments, FDD 22 performs this step as described elsewhere in this specification. The second control signal is the signal referenced as "chg_inject" in the previous descriptions. It should also be noted that the references to injecting charge essentially comprise selecting resistive elements to adjust or regulate the adjusted supply voltage.

Referring now to FIG. 8, method includes, at a first regulator block, receiving a target supply voltage level and a droop threshold level (90). In one embodiment, the target supply voltage level and droop threshold level are received from a power management block. The power management block may, for example, be a power management block for an entire system or integrated circuit and may be external to the circuitry of the described embodiments. The method also includes, at a second regulator block, receiving the droop threshold level from one of the first regulator block and the power management block, and converting the droop threshold level to an analog signal (92).

Thereafter, the method includes, in the first regulator, producing a first control signal to regulate said supply voltage based on a digital comparison of the target supply voltage level to a digital representation of an actual supply voltage level (94). The method further includes, in the second regulator, producing a second control signal to inject a charge or to regulate the adjusted supply voltage based on an analog comparison of the droop threshold level to the analog voltage corresponding to the actual supply voltage level (96). Finally, the method includes, in a supply adjustment block, activating or selecting selectable resistive elements based on at least one of the first and second control signals to generate the adjusted supply voltage level (98).

Referring now to FIG. 9, the method includes receiving a target supply voltage indication (100) and regulating the adjusted supply voltage to equal the target supply voltage using a first regulation loop having a first bandwith (102). The method also includes receiving a droop threshold level (104) and regulating the adjusted supply voltage according to the droop threshold level using a second regulation loop having a second bandwith different than the first bandwith (106). Finally the method includes power and at least one processor core using the adjusted supply voltage (108).

Thus a processor system with supply regulator system has been described that operates using a scalable resistive element selection logic to adjust a received supply voltage that allows multiple processor cores to have differing regulated voltages based off of a common supply. The regulator system utilizes digital logic for the regulation thereby saving IC real estate and power consumption. Further, associated header/footer supply adjustment blocks may be implemented that are substantially smaller and less complex and that may be operated at a substantially lower frequency than complex prior art designs partially because of the dual regulator aspects of the embodiments. In addition the regulator system operates reliably when fabricated using low voltage CMOS manufacturing processes to support the assertion of resistive elements in the header or footer circuitry while consuming a minimal amount of current and power. All components except the supply can be implemented cheaply on a single integrated circuit using available low voltage CMOS manufacturing processes.

The above-disclosed subject matter is to be considered illustrative, and not restrictive, and the appended claims are intended to cover all such modifications, enhancements, and other embodiments that fall within the true scope of the claims. For example, a regulator system can be built according to the principles described above for an arbitrary number N of different gain/attenuation levels to compensate for supply adjustment, in which N is an integer greater than or equal to 2. The alternative forms of the regulator system can have impedances to define regulation levels that vary according to the supported power levels and can be implemented using resistive elements fabricated utilizing related approaches but differing logic on a single integrated circuit die.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A processor system comprising:
    a power supply voltage input for receiving a supply voltage from an external voltage supply;
    at least one supply adjustment block comprising a plurality of selectable resistive elements for regulating an adjusted supply voltage based on said power supply voltage and a control signal; and
    at least one processor core having:
        a first input for receiving the supply voltage;
        a digital low-dropout (DLDO) control system further comprising:
            a first regulator coupled to receive a target supply voltage indication to produce the control signal to said supply adjustment block, wherein said first regulator and said at least one supply adjustment block are part of a first regulation loop having a first bandwidth;
            a second regulator coupled to generate a charge injection signal based upon a detected droop when a droop level of the supply voltage falls below a droop threshold value, wherein said second regulator and said at least one supply adjustment block are part of a second regulation loop having a second bandwidth such that said second regulation loop operates faster than said first regulation loop; and
            charge injection logic configured to inject a charge to said at least one processor core when the charge injection signal is asserted wherein said charge injection logic is coupled to said supply adjustment block; and
    wherein said at least one supply adjustment block is connected between said at least one processor core and at least one of said power supply voltage input and circuit common or ground.

2. The processor system of claim 1 wherein each of said selectable resistive elements comprise a FET that further includes a gate terminal coupled to receive at least a portion of said control signal to selectively activate said FETs.

3. The processor system of claim 1 further including a plurality of processor core modules wherein each of said plurality of processor core modules has a corresponding DLDO control system connected to receive the supply voltage to generate said adjusted supply voltage and said charge injections to said processor core modules.

4. The processor system of claim 1 wherein said first regulator of said DLDO control system comprises a configurable digital proportional-integral-derivative (PID) controller and said second regulator comprises a fast droop detector (FDD) and wherein said FDD of said DLDO control system comprises a sigma-delta digital-to-analog converter (DAC) coupled to receive said droop threshold value to produce an analog droop threshold voltage.

5. The processor system of claim 4 wherein said FDD of said DLDO control system comprises an analog comparator coupled to receive said supply voltage and said analog droop threshold voltage from said DAC, wherein said comparator produces the charge injection signal whenever said supply voltage is equal to or less than said analog droop threshold voltage.

6. A method for providing supply voltages to a multi-core processor, comprising:
   receiving a power supply voltage and a control signal and generating an adjusted supply voltage based upon the power supply voltage and the control signal;
   receiving, at a first regulator, a target supply voltage indication and a supply voltage level indication and producing said control signal to a supply adjustment block based upon a difference in said target supply voltage indication and said supply voltage level indication with a first bandwidth;
   comparing, in a second regulator, the adjusted supply voltage relative to a droop threshold level;
   based on said comparing, generating a charge injection signal when said adjusted supply voltage falls below the droop threshold value with a second bandwidth such that said generating said charge injection signal operates faster than said producing said control signal; and
   injecting a charge to at least one processor core of said multi-core processor based upon said charge injection signal.

7. The method of claim 6 further including, at said second regulator, receiving said droop threshold level in a digital form and converting to an analog droop threshold voltage and comparing said analog droop threshold voltage to the adjusted supply voltage.

8. The method of claim 7 wherein said first regulator comprises a digital low-dropout (DLDO) controller and said second regulator comprises a fast droop detector (FDD).

9. The method of claim 8 further including injecting a charge based upon a control word value produced by said DLDO controller when said supply voltage is less than said analog droop threshold voltage.

10. The method of claim 6 where said first regulator is a low bandwidth low power regulator, the method including selecting a first regulator set point to be a higher regulation set point relative to a second regulator set point of said second regulator.

11. The method of claim 6 wherein said second regulator is a fast response regulator, the method including selecting a second regulator set point to be a lower regulator set point relative to a first regulator set point of said first regulator.

12. The method of claim 6 further including receiving a first set point for said first regulator and a second set point for said second regulator from a power control block wherein said first set point is a target supply voltage level and said second set point is said droop threshold level and further wherein said first set point is greater than said second set point.

* * * * *